United States Patent [19]

Zettier

[11] Patent Number: 4,781,208
[45] Date of Patent: Nov. 1, 1988

[54] DEVICE FOR REGULATING THE CONCENTRATION OF CREAM IN A CENTRIFUGE FOR SEPARATING MILK

[75] Inventor: Karl-Heinz Zettier, Oelde, Fed. Rep. of Germany

[73] Assignee: Westfalia Separator AG, Oelde, Fed. Rep. of Germany

[21] Appl. No.: 79,310

[22] Filed: Jul. 29, 1987

[30] Foreign Application Priority Data

Aug. 7, 1986 [DE] Fed. Rep. of Germany ....... 3626782

[51] Int. Cl.$^4$ ...................... F16K 31/124; F16K 31/42
[52] U.S. Cl. ................................. 137/110; 137/487.5; 251/25
[58] Field of Search .................. 137/110, 487.5, 492.5, 137/488; 251/30.01, 25, 26

[56] References Cited

U.S. PATENT DOCUMENTS

| | | | |
|---|---|---|---|
| 1,866,653 | 7/1932 | Jauch | 137/487.5 |
| 2,145,544 | 1/1939 | Hapgood | 137/100 X |
| 2,949,125 | 8/1960 | Gilmore et al. | 137/110 X |
| 4,089,007 | 5/1978 | Perry et al. | 137/487.5 X |
| 4,144,804 | 3/1979 | O'Keefe et al. | 137/110 X |
| 4,294,113 | 10/1981 | Sprott et al. | 137/110 X |
| 4,671,319 | 6/1987 | Namand | 137/488 X |

FOREIGN PATENT DOCUMENTS 3245901  6/1984  Fed. Rep. of Germany .

Primary Examiner—Martin P. Schwadron
Assistant Examiner—Stephen M. Hepperle
Attorney, Agent, or Firm—Sprung Horn Kramer & Woods

[57] ABSTRACT

The device has one valve body that can be set at a constant minimum cross-section and another valve body that is not activated until the pressure in a supply connection becomes too high. The valve bodies are accommodated in separate and parallel-streamed valve housings. Since the design allows free selection of the cross-section in the valve housings, extremely wide fluctuations in the concentration of cream can be mastered in accordance with controls technology by means of the second valve body.

2 Claims, 1 Drawing Sheet

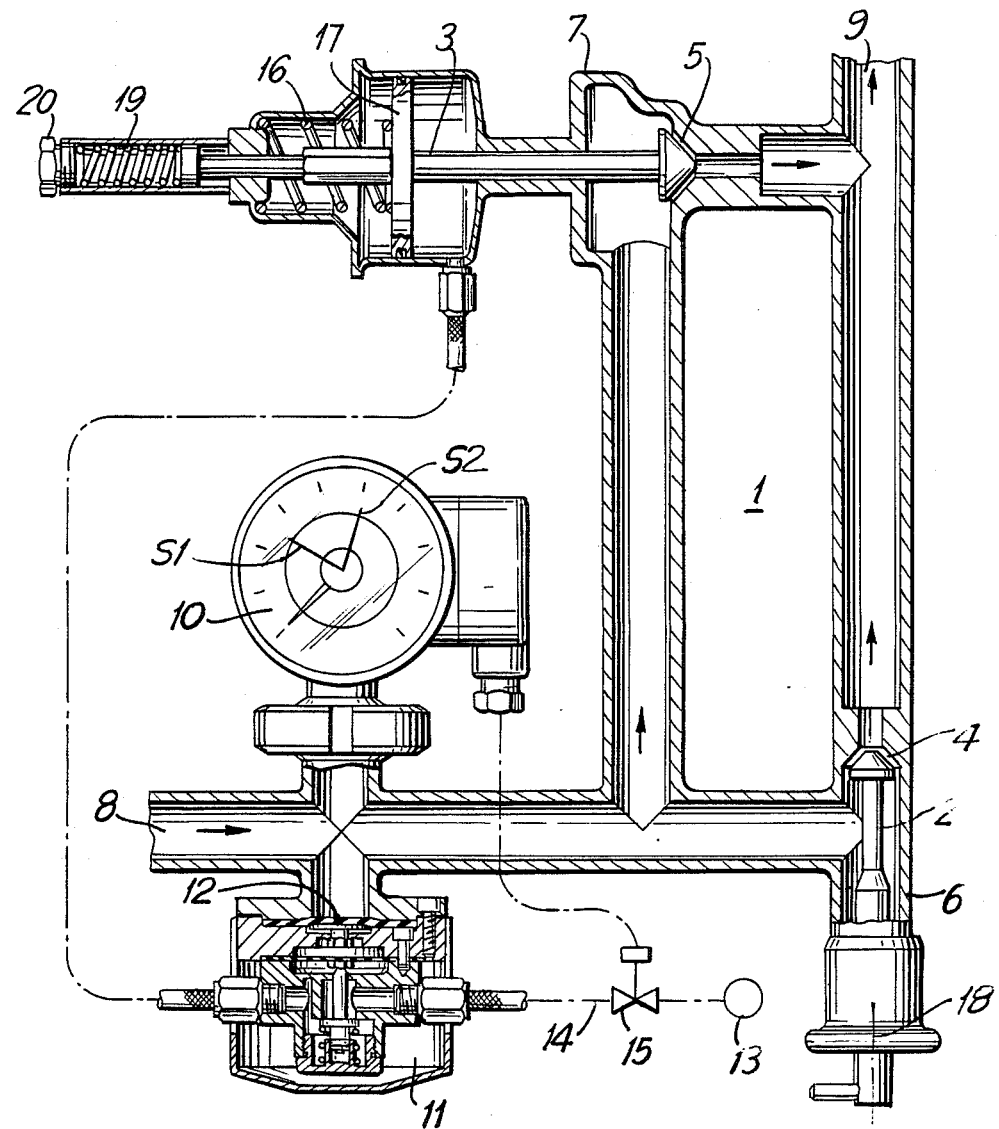

DEVICE FOR REGULATING THE CONCENTRATION OF CREAM IN A CENTRIFUGE FOR SEPARATING MILK

BACKGROUND OF THE INVENTION

The present invention relates to a device for regulating the concentration of cream in a centrifuge for separating milk, with a choke that can be set by means of a manually activated valve body at a constant minimum cross-section and which can be automatically expanded by another valve body when a prescribed outflow pressure is exceeded.

A device of this type is known, for example from German OS No. 3 245 901. The minimum cross-section is manually established by a valve body in this device as well. The established cross-section is automatically expanded by axial displacement of the valve seat associated with the body. One drawback is that only the cross-section of the single choking point that is not exploited during manual adjustment is available for the expansion. The more extensive the manually established cross-section is, the less is left over for the actual regulating process.

The concentration of the cream, however, frequently varies considerably in practice. The available expansion increment in the known devices is accordingly insufficient to prevent impermissibly high concentrations of cream. The centrifuge can clog up and the skimming efficiency decrease.

SUMMARY OF THE INVENTION

The object of the present invention is to improve the known device to the extent that even very extensive variations in the concentration of cream can be responded to with a sufficient variation in cross-section.

This object is attained in accordance with the invention by the improvement wherein one seat is associated with the first valve body and another seat with the second valve body.

This solution allows the ratio of the constant cross-section to the variable cross-section to be selected as desired and hence to compensate for any conceivable disruptive parameter that can occur in separating milk.

The valve bodies and the seats associated with them are preferably accommodated in separate housings.

To prevent mutual interference the valve housings are streamed in parallel.

It has turned out to be practical not to activate the second valve body until the second switchover point of a contact manometer located at a common supply connection is exceeded. Slight variations in the concentration of cream, which are not extensive enough to provide a drawback, are accordingly neglected. The overall device will accordingly operate more stably, and continuous variations in the outflow parameters are avoided.

The second valve body can be activated through a connection to a source of compressed air for example. The connection can be established by a remotely controlled valve connected to the contact manometer.

A pressure converter controlled by the pressure in the supply connection can be positioned between the remotely controlled valve and the the second valve body. This makes it possible to respond in a sort of step function to an impermissibly high increase in the pressure in the supply connection. The pressure in the supply connection acts directly on a diaphragm in the pressure converter, which in turn forwards a more than proportional change in the control pressure deriving from the source of compressed air to the second valve body.

A preferred embodiment of the invention will now be specified with reference to the attached drawing,

BRIEF DESCRIPTION OF THE DRAWING

The FIGURE is a vertical section through a device in accordance with the invention.

DETAILED DESCRIPTION OF THE PREFERRED EMBODIMENTS

A device 1 for regulating the concentration of cream in a centrifuge for separating milk has two valve bodies 2 and 3. Their seats 4 and 5 respectively are accommodated in separate housings 6 and 7 respectively. Valve housings 6 and 7 are streamed in parallel and are supplied from a common connection 8 and emptied through a common outflow connection 9. A contact manometer 10 with switching contacts $S_1$ and $S_2$ and a pressure converter 11 are positioned at supply connection 8. Pressure converter 11 operates in principle like a commercially available pressure-reduction valve and has a diaphragm 12 that is directly subjected to the pressure of the product in supply connection 8. A line 14 with a remotely controlled valve 15 leads through pressure converter 11 to second valve body 3 in valve housing 7. A spring 16 forces second valve body 3 closed. Second valve body 3 releases its seat 5 when pressure builds up below its piston 17. First valve body 2 is set manually by means of a handle 18. Another spring 19 makes it possible in conjunction with a set screw 20 to vary the closure force acting on piston 17, allowing the device's control curve to be adapted to different operating conditions.

The function of the device will now be described. A pressure somewhere between the two switching points $S_1$ and $S_2$ of contact manometer 10 is established in supply connection 8 by rotating handle 18. Second valve body 3 is resting against seat 5 because valve 15 has not been activated. Valve 15 will open as the concentration of cream increases and the pressure in supply connection 8 rises above switching point $S_2$. Compressed air will accordingly flow through pressure converter 11 to second valve body 3, which accordingly lifts off valve seat 5. The extent of the accordingly released cross-section depends on the pressure of the air, which is controlled through pressure converter 11. The more powerful the pressure in supply connection 8, the more powerful the air pressure established by pressure converter 11. The augmentation produced by pressure converter 11 will rapidly reduce even discontinuous pressure increases. Valve 15 will close as soon as the pressure drops below switching point $S_1$, interrupting the supply of compressed air. Second valve body 3 will close again, and the regulating process is finished. Device 1 will continue to operate at the prescribed minimum cross-section.

It will be appreciated that the instant specification and claims are set forth by way of illustration and not limitation, and that various modifications and changes may be made without departing from the spirit and scope of the present invention.

What is claimed is:

1. In a device for regulating the concentration of cream in a centrifuge for separating milk, having an inlet, an outlet, choke means between the inlet and outlet and including a manually activatable first valve body for setting the choke at a constant minimum cross-section, and a second valve body for expanding the cross section when a prescribed outflow pressure is exceeded, the improvement wherein the choke means includes one seat associated with the first valve body and another seat associated with the second valve body, wherein the valve bodies and the seats associated with them are accommodated in separate housings and further comprising a contact manometer with two switching contacts located at the inlet upstream of both valve housings and means for activating the second valve body only after the second switching contact is exceeded, wherein the activating means comprises a source of compressed air and a remotely controlled valve connecting the second valve body housing and the source of compressed air and a pressure converter controlled by the pressure in the device and positioned between the remotely controlled valve and the second valve body.

2. The device as in claim 1, wherein the valve housings are streamed in parallel between the inlet and outlet.

* * * * *

UNITED STATES PATENT AND TRADEMARK OFFICE
CERTIFICATE OF CORRECTION

PATENT NO.    : 4,781,208

DATED         : November 1, 1988

INVENTOR(S)   : Karl-Heinz Zettier

It is certified that error appears in the above-identified patent and that said Letters Patent is hereby corrected as shown below:

Col. 3, line 3         After "choke" insert --means--

Signed and Sealed this

Nineteenth Day of September, 1989

Attest:

DONALD J. QUIGG

Attesting Officer        Commissioner of Patents and Trademarks